United States Patent [19]
Curtis et al.

[11] Patent Number: 5,661,521
[45] Date of Patent: Aug. 26, 1997

[54] SMEAR CORRECTION OF CCD IMAGER USING ACTIVE PIXELS

[75] Inventors: Lucas P. Curtis, Churchville; Mark E. Shafer, Fairport, both of N.Y.

[73] Assignee: Eastman Kodak Company, Rochester, N.Y.

[21] Appl. No.: 462,414

[22] Filed: Jun. 5, 1995

[51] Int. Cl.$^6$ .................................. H04N 5/335
[52] U.S. Cl. .................................. 348/249; 348/255
[58] Field of Search .................................. 348/207, 241, 348/243, 244, 245, 248, 249, 250, 251, 255, 607, 615, 229, 222, 618, 671, 678; H04N 5/335

[56] References Cited

U.S. PATENT DOCUMENTS

| | | | |
|---|---|---|---|
| 4,010,319 | 3/1977 | Levine | 348/249 |
| 4,490,744 | 12/1984 | Levine | 348/249 |
| 4,510,528 | 4/1985 | Bergen | 348/249 |
| 4,558,366 | 12/1985 | Nagumo | 348/249 |
| 4,581,651 | 4/1986 | Miyata et al. | 348/249 |
| 4,594,612 | 6/1986 | Levine | 348/249 |
| 5,113,245 | 5/1992 | Oda | 348/249 |
| 5,121,214 | 6/1992 | Turko et al. | 348/249 |
| 5,376,966 | 12/1994 | Takase | 348/243 |
| 5,414,466 | 5/1995 | Noreve et al. | 348/241 |

*Primary Examiner*—Andrew Faile
*Assistant Examiner*—Tuan V. Ho
*Attorney, Agent, or Firm*—James D. Leimbach

[57] ABSTRACT

A smear correction circuit for elimination of smear error within image sensing devices wherein image receiving means receive CCD image data, a determination of a smear scaling factor for smear estimation is made, the smear scaling factor being determined by a ratio of smear error per given level of illumination. The smear estimation means provide for the determining of a value for smear estimation on a per line basis. Adjustment of the image data is made corresponding to the smear estimation and dark level correction values prior applying the adjusted data to gain adjustment circuitry.

19 Claims, 6 Drawing Sheets

SMEAR CORRECTION OF CCD IMAGER USING ACTIVE PIXELS

FIELD OF INVENTION

The invention relates generally to the field of image sensors, and in particular to smear correction techniques employed within image sensors.

BACKGROUND OF THE INVENTION

CCD (charge coupled device) imagers are commonly used to capture digital images. The CCD imager is a solid state device which consists of an array of photosensors coupled with a CCD shift register. The photosensors convert incident photons to electrons resulting in a charge buildup in the photosensor which is proportional to the total amount of light incident over a given period of time. At the end of this time period (commonly referred to as the "integration time", the time over which electrons are collected) the charge from each photosensor is transferred to a corresponding location in an analog CCD shift register. The packets of charge now can be shifted sequentially onto a capacitor, generating a voltage which can be measured at the output of the imager. Typically, charge from the previous integration time period is shifted out of the device while charge is being integrated in the photosensors, resulting in a delay of one integration time period between integration and readout.

CCD imagers typically fall into two categories: linear array and area array imagers. In a linear array imager, the pixels (individual photosensor locations are commonly referred to as a "pixels") are arranged in one long row. This type of device is used to capture one line of an image at a time. To capture an entire image, many lines must be captured in succession while either the object or the imager is translated past the other. Sometimes, more than one line of photosensors will be fabricated into the same device. When combined with color filtering, color capture of images is possible. Trilinear (R, G, B) imagers are made this way.

In an area array imager, the photosensors are arranged in a two dimensional pattern, allowing for capture of the entire image during one integration time period. Typically, there is still only a one line shift register, requiring that pixel data be read out one line at a time. For this reason, subsequent discussions will deal with line array imagers only, although the techniques described apply to area imagers as well. Color filtering of photosensors in area arrays is also possible.

Many types of artifacts may be introduced into the image as a result of the CCD imager. Among them is "smear". Smear occurs when photo-generated electrons not captured by the potential well of the photosensor, become distributed in the substrate and are captured by the potential well of the shift register. The result is an extra charge "offset" which is added equally to each pixel shifted out of the device, and is proportional to the total amount of light incident on the entire array of photosensors. Part of the smear is contributed during integration, as smear charge is deposited into the shift register before photosensor charge is transferred, and part of the smear is contributed during readout of the shift register. Since charge transfer is delayed by one integration time period relative to charge integration, the smear for a given integration time period contains components from the current integration time period as well as the previous integration time period.

Smear becomes visible in images when both dark and bright regions of the image are captured during a single line. The light from the bright regions causes smear to be added to all pixels, including those which should be dark.

To correct for smear, the smear offset for a given line must be measured or calculated and then subtracted from each pixel's readout value. A common approach involves the use of "light shield" pixels. A light shield pixel is an extra pixel which is fabricated on the device but is completely masked so as not to receive light. Because light is never incident on the photosensor, any charge which accumulates must be from some undesirable source, such as smear. Therefore, the charge from the light shield pixel can be measured in the same way that charge is measured from all other "active" pixels, and then subtracted from the values of the active pixels.

One disadvantage of this approach is that any measurement of the light shield pixel value will have a significant error associated with it. The reason for this is that CCD imagers are inherently noisy devices. Sources of noise include: (1) Dark Noise, which is charge developed as a result of the thermal excitation of free electrons in the photosensor and shift register; (2) Shot Noise, which is a variation in the random arrival of photons as predicted by Poisson statistics; and (3) Electronics Noise, which can be any noise introduced by the processing and measuring electronics.

Since the smear offset is subtracted from every active pixel value for the entire line, any error in its measurement will be added to each of these pixels as well. Each line will have a different error associated with it. In actual viewed images, this error can easily be as objectionable as the smear artifact which is being removed.

Two techniques are commonly used to reduce the measurement error:

1. The values of several light shield pixels in the line are measured and averaged; and
2. The values of light shield pixels from several lines are measured and averaged.

By averaging several measurements, the error is reduced. Since the noise sources are often uncorrelated, the error in the average is reduced by:

$$\text{error}_{average} = \text{error}_{single}/\text{sqrt}(\text{number of measurements})$$

Even with method 1, however, it may not be practical to manufacture an imager with enough light shield pixels to adequately reduce the error in the measurement. With method 2, the response of the smear correction is slowed because of the filtering effect of averaging previous lines.

From the foregoing discussion it should be apparent that there remains a need within the art for smear correction techniques that provide for imagers that are practical to manufacture without creating imagers that are unduly slow.

SUMMARY OF THE INVENTION

The present invention is directed to overcoming one or more of the problems set forth above. Briefly summarized, according to one aspect of the present invention, a smear correction circuit for elimination of smear error within image sensing devices (CCD) comprising:

image receiving means for receiving CCD image data;
    means for determining a smear scaling factor for smear estimation, the smear scaling factor being determined by a ratio of smear error per given level of illumination;
    smear estimation means for determining a value of smear estimation on a per line basis;
    means for adjusting the image data corresponding to smear estimation and dark level correction; and
    means for applying the adjusted data to means for gain adjustment.

The new approach has been developed which eliminates the need for a large number of light shield pixels, and reduces the error in the smear offset to extremely small levels. This approach relies on the fact that the smear offset is linearly proportional to the total amount of light incident on the imager during its integration time. The signal values from all active pixel locations are accumulated or averaged, and multiplied by a predetermined scaling factor to produce an estimate of the actual smear offset. The scaling factor is simply the worst case smear expressed as a percentage of the maximum signal value, usually between 0 and 10%. Since the number of active pixels is usually large, the error in the accumulated value is very small, even though the error in each individual pixel measurement is larger on average than that of a light shield pixel (because of the additional shot noise component in an illuminated pixel).

For example, consider a typical imager containing 512 active pixels and 8 light shield pixels. Typical values for total dark noise and bright shot noise are normalized to 1 and 8 units, respectively. The error in the average measurement of the eight light shield pixels is:

$$Ds/\sqrt{number\_of\_light\_shields} = 1/\sqrt{8} = 0.35$$

Where:

Ds is the dark noise

The worst case error in the estimate of smear offset obtained when averaging the measurements of the 512 active pixels is:

$$Ws*Ns/\sqrt{number\_of\_active\_pixels} = 0.1*8*\sqrt{512} = 0.035$$

Where:

Ws is the worst case scaling factor

Ns is the amount of shot noise

This is an order of magnitude of improvement. The error is even smaller given smaller scaling factors and higher numbers of active pixels.

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The present invention has the advantage of eliminating the need for a large number of light shield pixels and reducing smear error to extremely small levels.

DETAILED DESCRIPTION OF THE INVENTION

Figure 1:
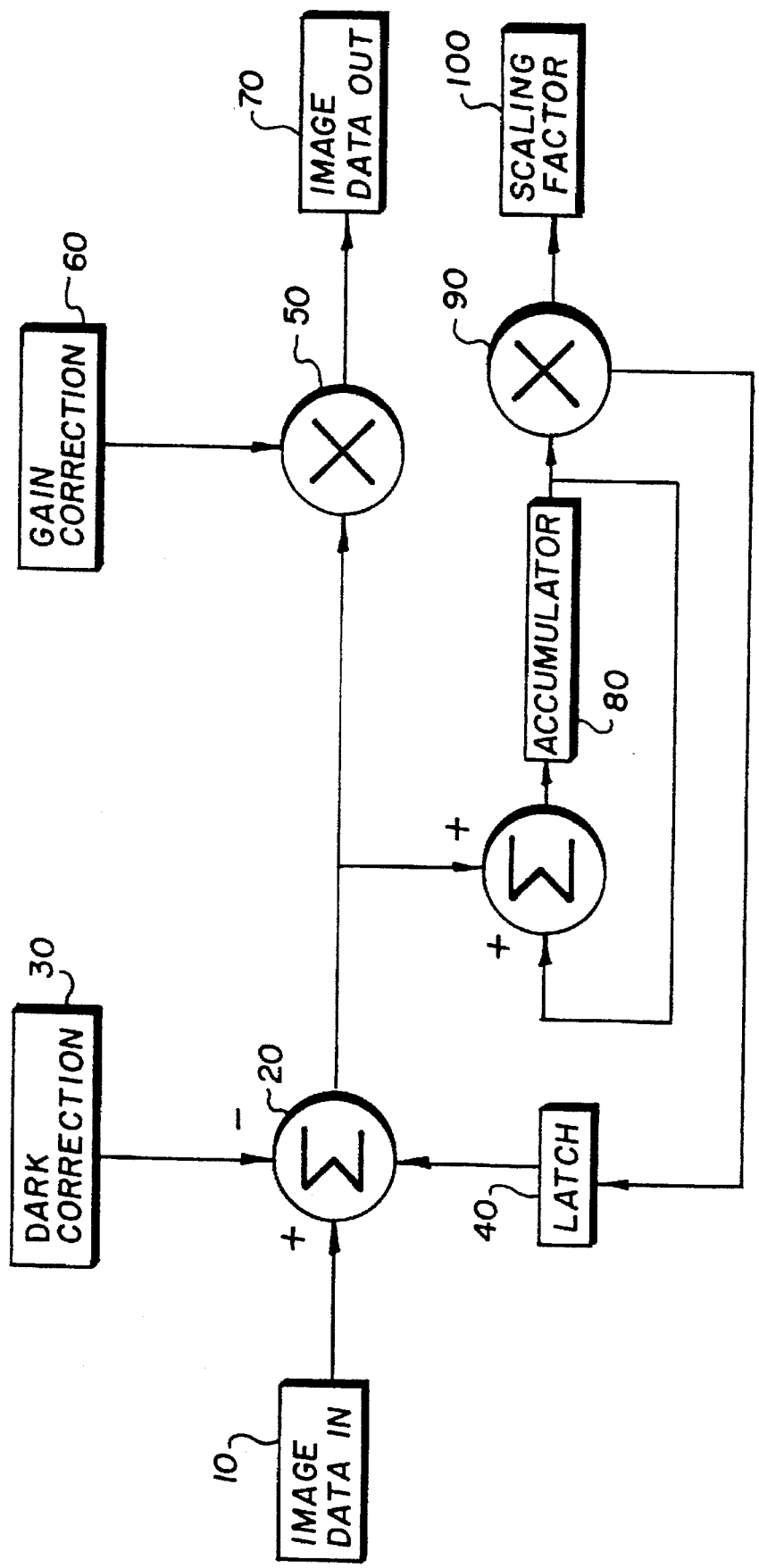
FIG. 1 is a block diagram of the data processing path.

It has been discovered that smear within image sensors can be reduced by effective use of gain and dark correction data that has been determined during calibration periods. Referring to FIG. 1, which is a block diagram of the preferred embodiment of the present invention, the image data processing path includes active pixel smear correction. Two types of image data correction are used to obtain the final smear corrected data. As shown in FIG. 1, dark correction 30 and gain correction 60 are directly combined with the image data between the image data input 10 and the image data output 70. The preferred embodiment shown in FIG. 1 is only one possible configuration that can be used to achieve the results of the present invention.

Still referring to FIG. 1, within the preferred embodiment, Image Data input 10 provides digitized data, typically from a CCD imager. At summing stage 20, dark correction and smear correction takes place by combining these values with the data from the image data input 10. The values used for dark correction come from the dark correction 30. The dark correction 30 is a storage device that has been previously loaded with dark corrections values during a calibration cycle. The smear correction value for an entire line is provided by latch 40. This value was calculated during the previous line.

Image data which has been corrected for dark offset and smear offset is sent to the gain correction multiplier 50 and active pixel accumulation 80. Active pixel accumulation 80 sums the image data values from all active pixels, multiplies the accumulated value by the smear scaling factor 100 at multiplier 90, and holds the result in latch 40 for use on the next line. Active pixel accumulation occurs before gain correction, so that the contribution from each active pixel towards the total illumination is weighted equally.

Gain correction is performed at gain correction multiplier 50 by using gain correction values from gain correction storage 60, providing output image data 70 for use by subsequent image processing stages.

Figure 2:
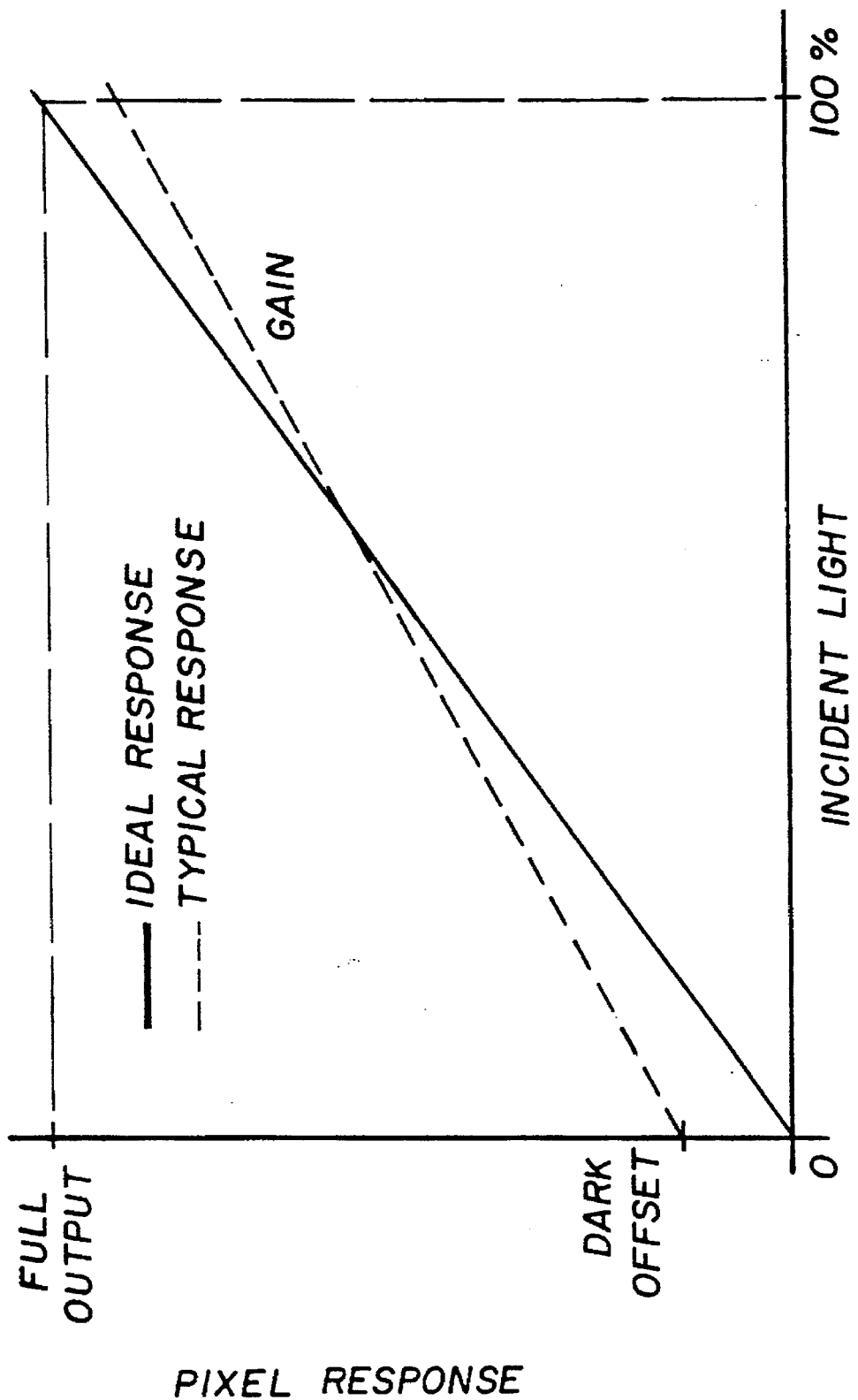
FIG. 2 is a graph illustrating the typical pixel response function.

Referring now to FIG. 2 in conjunction with FIG. 1, FIG. 2 shows the typical response function of an individual pixel. The dashed line shows the typical response. The solid line shows the ideal (desired) response. Dark and gain correction are used to produce the desired response from a pixel which exhibits a non ideal response. As stated above, these values are determined during calibration periods. When no light is incident on the photosensor, it is desirable that the pixel produce no output signal. In reality, the photosensor will produce a small output signal, called the "dark offset". The dark offset can be measured when no light is incident, and be subtracted from all subsequent measurements taken from that pixel. This process is called "dark correction". If the variation in the dark offset among all pixels is small enough, one dark offset may be used for all pixels, otherwise a separate dark offset must be applied for each pixel.

When all available light (as determined by illumination, optics, etc.) is incident on a pixel, it is desirable that the pixel produce a known output signal. In reality, each pixel will produce a different output signal (referred to as the "bright point") because of variations in pixel response, illumination uniformity, etc. Signal output at all other illumination levels is assumed to fall on a straight line connecting the dark offset to the bright point. The slope of this line is the "gain" of the pixel. A gain correction factor can be calculated which will set the bright point to the desired value. All subsequent pixel values are multiplied by the gain correction factor. This process is called "gain correction".

In both cases, a very accurate measurement is required to produce an accurate correction value. To achieve this, many measurements from the same pixel are made repeatedly and averaged together to reduce the error in the measurement caused by noise. Measurements at full illumination or in the dark can be made indefinitely and averaged until the required precision is achieved.

Referring to FIG. 1, image data 10 is digitized from a CCD imager. At summing stage 20, dark correction and smear correction take place. The dark correction storage 30 has been previously loaded with dark correction values during a calibration cycle. The smear correction for an entire line is provided by latch 40 with the value calculated during the previous line using the values from the equations discussed below. Image data that has been corrected for dark offset and smear offset is sent to gain correction 50 and active pixel accumulation 80. Active pixel accumulation 80 sums the image data values from all active pixels, multiplies the accumulated value by the smear scaling factor 100 at multiplier 90 and holds the result in latch 40 for use on the next line. Active pixel accumulation occurs before gain correction, so that the contribution from each pixel towards the total illumination is weighted equally.

Gain correction is performed at gain correction multiplier 50, using gain correction values from gain correction storage 60, providing output image data 70 to subsequent processing stages.

The same data that is used to generate dark and gain corrections values can be used to generate extremely accurate smear scaling factors. In order to generate the smear scaling factor data must be collected from both the active and light shield pixels. This data can then be used to determine the per cent of smear by averaging the maximum illumination from light shield pixels (i.e. gain) and subtracting from this amount the average minimum illumination (i.e. dark) of the light shield pixels. The average difference between light shielded pixels for maximum (gain) and minimum (dark) values is divided by a similar difference between the active pixels. This relationship is shown in Equation 1, below.

$$\text{Smear \%} = \frac{\text{AVG\_light\_shield}_{max} - \text{AVG\_light\_Shield}_{dark}}{\text{AVG\_active\_pixel}_{max} - \text{AVG\_active\_pixel}_{dark}} \qquad \text{Equation 1}$$

The per cent smear is determined by average values arrived at using the mathematical representations discussed below which are best understood while referring to FIG. 3 in conjunction with FIG. 4. The numerator of Equation 1 is arrived at by taking the average amount of illumination for light shield pixels for all the light shield pixels during a calibration period.

Figure 3:
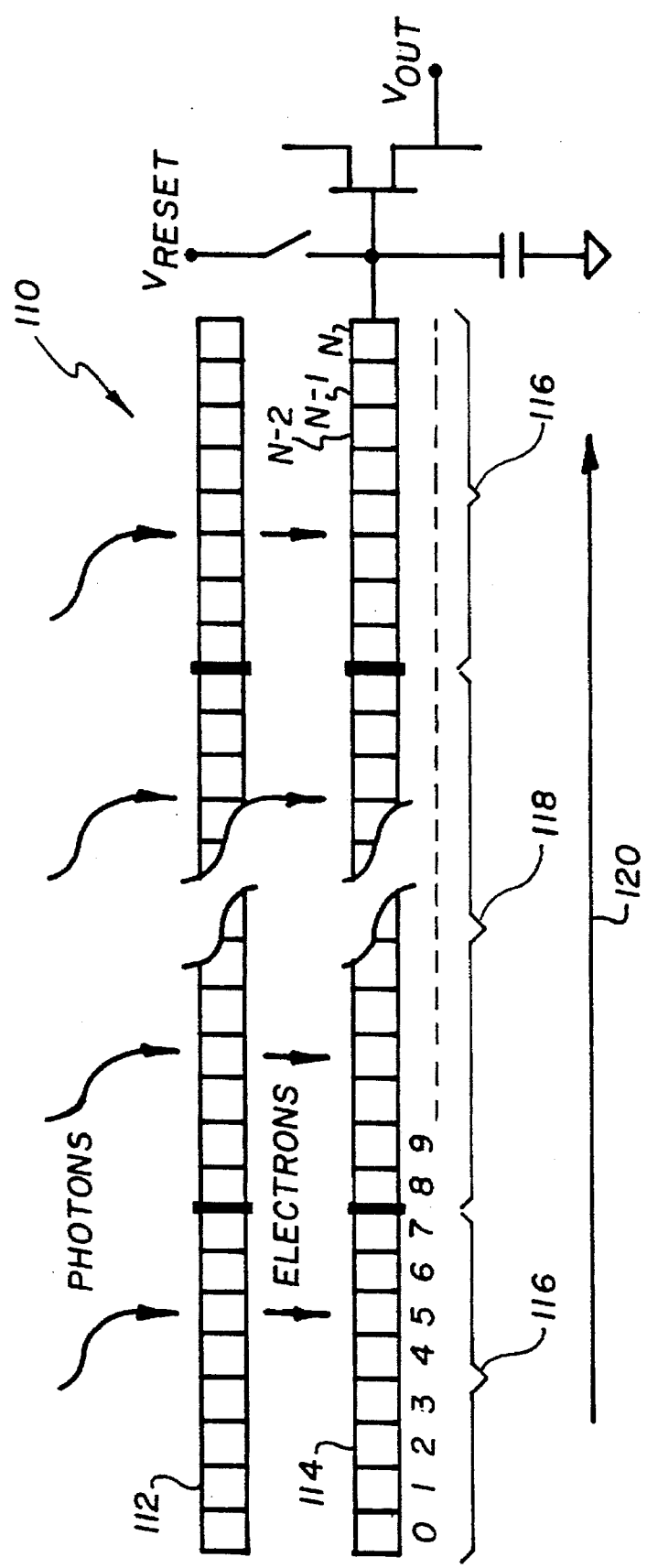
FIG. 3 is a diagram of a linear CCD imager.

Referring now to FIG. 3, which is a functional representation of a linear CCD image sensor 110 having a number "N" image sensing elements comprising photodiodes 112 and CCD shift register 114. The photodiodes 112 have incident photons that generate electron hole pairs, within the photodiodes 112, which are transferred to CCD shift register 114 that are read out in direction 120 as indicated by the arrow. The first eight pixels and the last eight pixels, within image sensor 110, are light shield pixels 116, the pixels between the light shield pixels 116 are active pixels 118.

Figure 4:
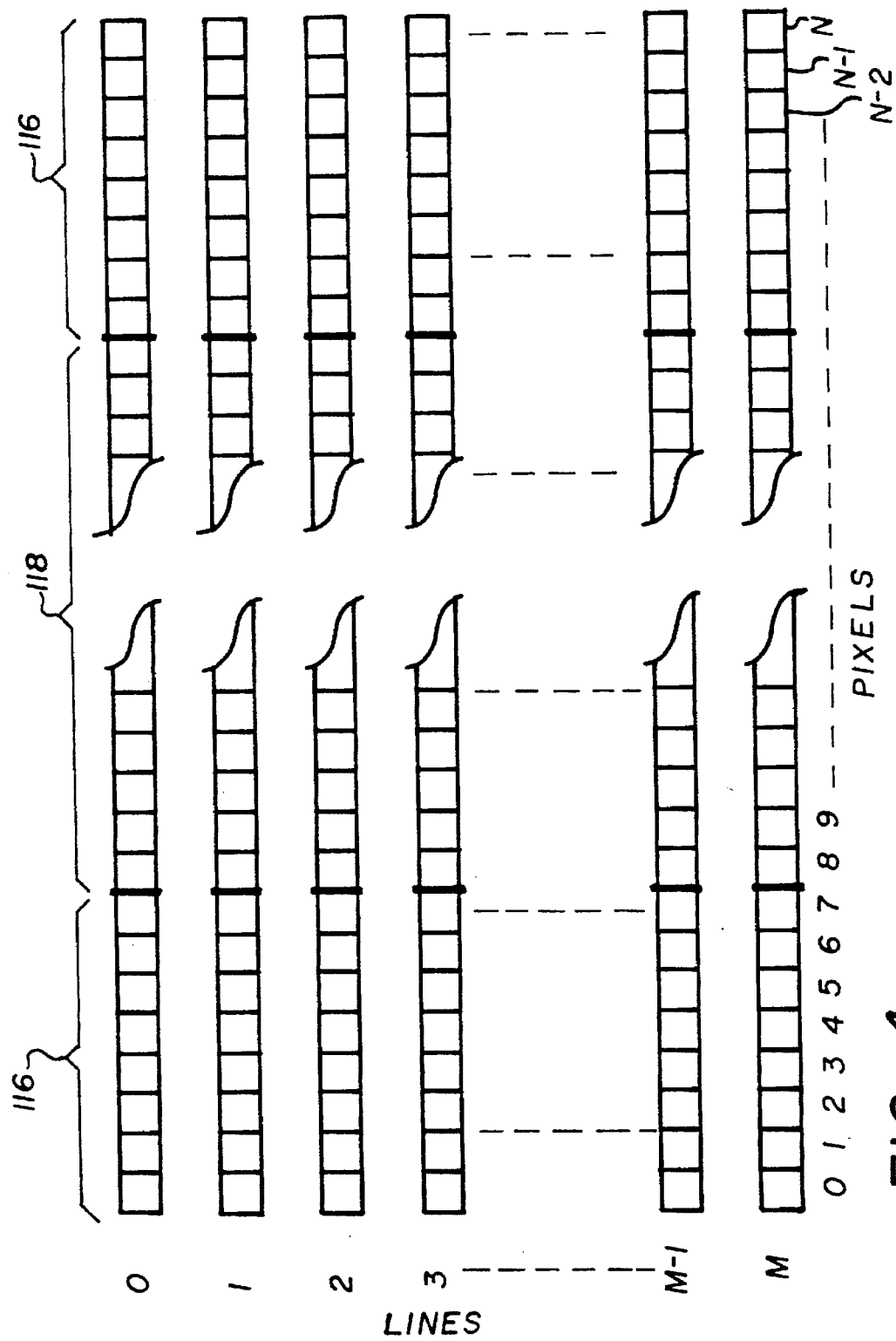
FIG. 4 is a diagram of a typical scan using the imager of FIG. 3.

Referring now to FIG. 4 in conjunction with FIG. 3, if p(x, y) is used represent the value for a pixel location, denoted as "x", within the image sensor 110, then for a multiple line scanned by that image sensor 110, the value for pixel location "x", in any of the given lines, denoted as "y", can be averaged. Assuming that L(x) denotes the average value for a pixel location, "x", over all the lines "y" scanned, then Equation 2 would accurately represent the average value, L(x), for that pixel location after line "y" has been scanned M+1 number of times. This relation can be seen by Equation 2 in conjunction with FIG. 4.

$$L(x) = \frac{1}{M+1} \sum_{y=0}^{M} p(x,y); \qquad \text{Equation 2}$$

Furthermore if LS is used to represent the average value of the light shield pixels contained in M+1 lines scanned as shown in FIG. 4, the average light shield value, LS, is given by Equation 3.

$$LS = \frac{1}{8} \sum_{x=0}^{7} L(x) + \frac{1}{8} \sum_{x=N-7}^{N} L(x) \qquad \text{Equation 3}$$

Also, if AP is defined as the accumulation of pixel averages for the active pixels "x" within M+1 lines, this value is represented by AP as seen in Equation 4 below.

$$AP = \sum_{x=8}^{N-8} L(x) \qquad \text{Equation 4}$$

If MS is defined as the maximum possible smear, measured from the light shield pixels, where $LS_{max\ illum}$ represents the average light shield pixel during maximum illumination, i.e. gain and $LS_{dark}$ is the average light shield pixel value from the dark calibration discussed previously, then MS can be represented by Equation 5.

$$MS = LS_{max\ illum} - LS_{dark} \qquad \text{Equation 5}$$

and if MA is the maximum active pixel accumulation, where $AP_{max\ illum}$ is the average active pixel accumulation during maximum illumination and $AP_{dark}$ is the average active pixel accumulation from the dark calibration period, then MA is defined by Equation 6.

$$MA = AP_{max\ illum} - AP_{dark} \qquad \text{Equation 6}$$

The smear scaling factor is represented by SSF, and defined as the ratio of the maximum possible smear to the maximum possible active pixel accumulation, as shown by Equation 7.

$$SSF = \frac{MS}{MA} \qquad \text{Equation 7}$$

The SSF from Equation 7 is loaded into the register for holding the scaling factor 100, as shown on FIG. 1, after calibration periods.

The smear estimate is performed during scanning and is calculated as shown in Equation 8, where $AP_{actual}$ is the actual pixel accumulation during an actual scan line.

$$SMEAR_{est} = \frac{MS}{MA} * AP_{actual} = SSF * AP_{actual} \qquad \text{Equation 8}$$

Figure 5:
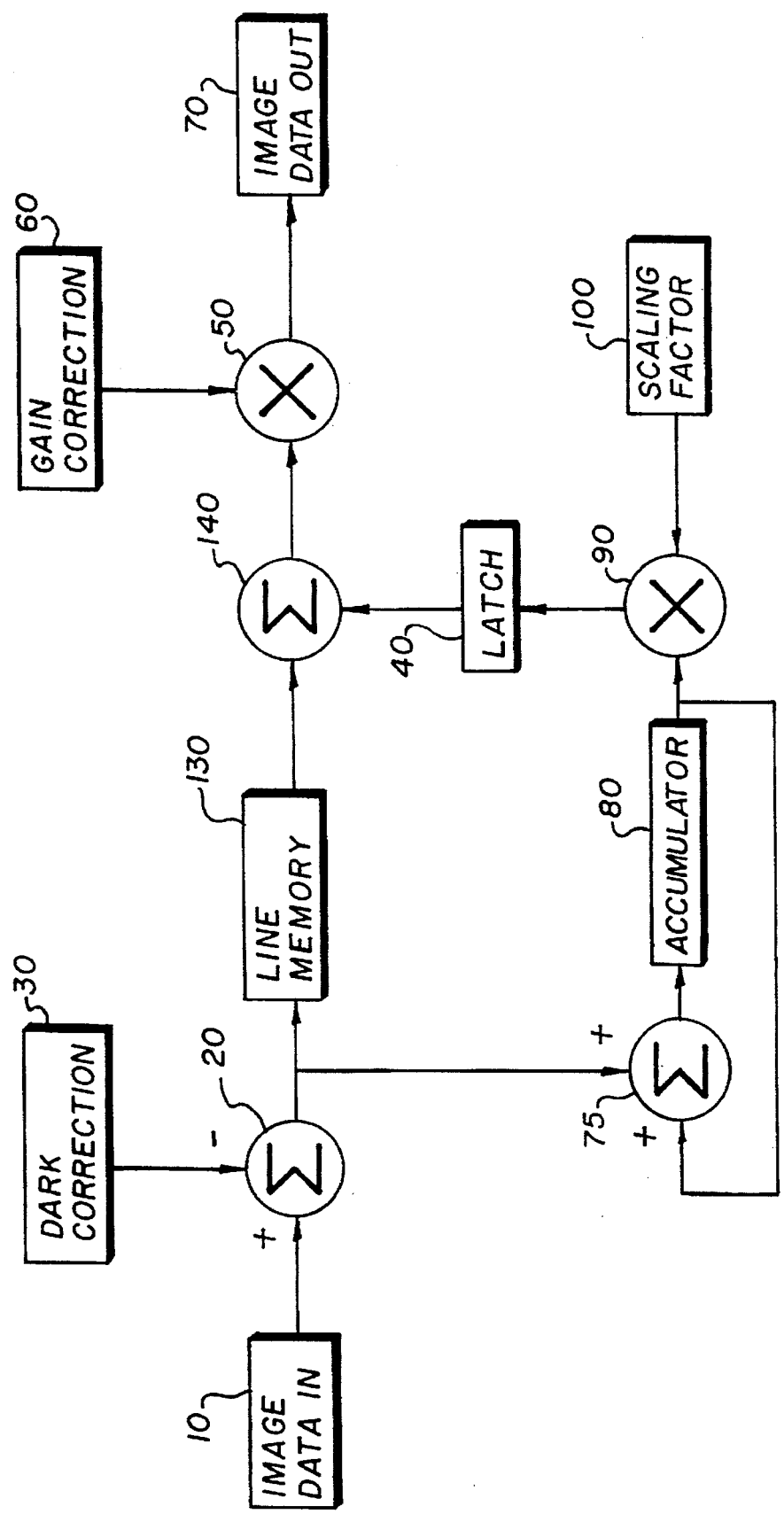
FIG. 5 is an alternative to the processing path of FIG. 1.

Referring now to FIG. 5, a data processing path is shown having similarities to that of FIG. 1. The basic difference in the path shown in FIG. 5 is that line memory 130 will retain an entire line of data from summation circuit 20. This line of data is simultaneously parallel processed to generate a smear estimate as in FIG. 1. However, instead of being used to smear correct for the next line, as in FIG. 1, the smear estimate in FIG. 5, is used to correct for the same line by being made available to summation circuit 140 by latch 40 where it can provide smear correction for the data retained in line memory 130.

Figure 6:
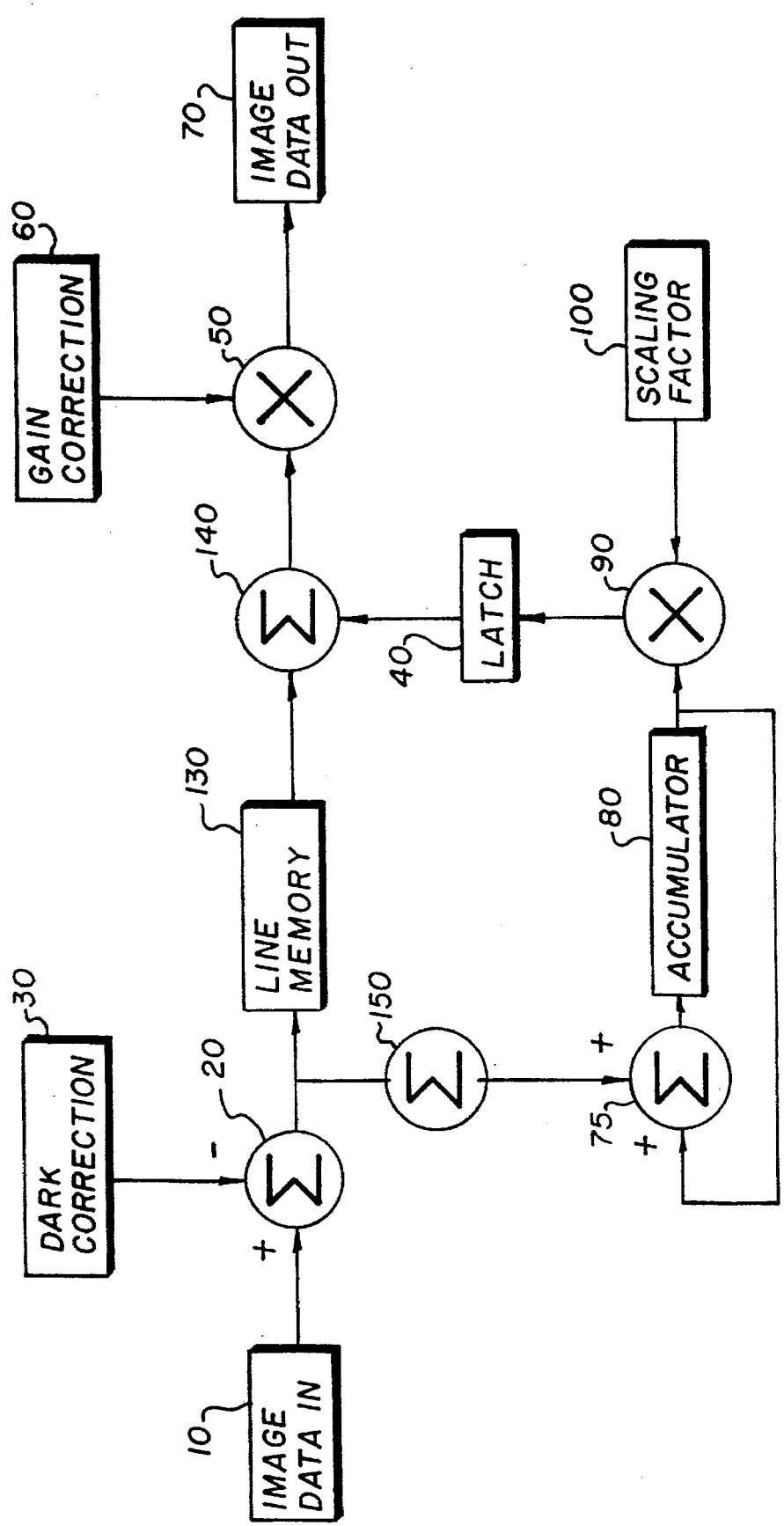
FIG. 6 is another alternative to the processing path of FIG. 1.

Referring now to FIG. 6, another alternative processing path provides an additional summation circuit 150 to provide smear corrected data to accumulator 80. The smear correction for the accumulated data is delayed by one line as in FIG. 1. However, the processing path in FIG. 6 provides more accuracy than the processing path as shown in FIG. 5.

While a linear CCD device has been used to illustrate the concepts of the present invention, these concepts could also be embodied within interline devices using for either progressive scan or interlaced, as well as with frame transfer devices.

Furthermore, while the preferred embodiment has shown various circuits to perform numerous functions, these functions could also be performed using a digital computer performing algorithms with equivalent functions to the illustrated circuits.

The invention has been described with reference to a preferred embodiment. However, it will be appreciated that variations and modifications can be effected by a person of ordinary skill in the art without departing from the scope of the invention.

PARTS LIST

10 Image Data Input
20 Summation
30 Dark Correction
40 Latch
50 Gain Multiplier
60 Gain Correction
70 Image Data Output
80 Accumulation
90 Scaling Multiplier
100 Scaling Factor
110 Linear CCD image sensor
112 Photodiode
114 CCD shift register
116 Light shield pixels
118 Active pixels
120 Read out direction
130 Line memory
140 Summation circuit
150 Summation circuit

We claim:

1. A smear correction circuit for elimination of smear error within image sensing devices comprising:
    image receiving means for receiving digitized CCD image data;
    means for applying dark signal correction and gain correction data;
    means for applying a smear scaling factor for smear estimation based on dark signal and gain correction data;
    means for adjusting the digitized image data corresponding to smear estimation and dark level correction; and
    means for applying the adjusted digitized data to gain adjustment means.

2. The invention of claim 1 wherein the means for applying a smear scaling factor further comprises:
    accumulation means for combining image data from successive pixels in a complete line of active pixels;
    multiplying means for applying the smear scaling factor to the accumulated pixel data for a line to determine the smear estimation; and
    storage means for temporary storage of the smear estimation to be applied to every pixel on a single line.

3. The circuit of claim 2 wherein the accumulation means for combining image data from successive pixels uses data that has been smear corrected using the smear estimate from the previous line as image data.

4. The invention of claim 1 wherein the means for applying dark signal correction and gain correction further comprise means for applying dark and gain correction data that is determined during a calibration period.

5. The invention of claim 1 wherein the means for applying a dark signal correction further comprises dark calibration scan and storing means for applying an accumulation of the dark response level for each of the photosites.

6. The invention of claim 5 wherein the means for applying a dark signal correction further comprises a pixel by pixel offset for subtracting the imager dark pattern non uniformity to yield zero value for dark reference.

7. The invention of claim 1 wherein the smear scaling factor being determined by a ratio of smear error per given level of illumination.

8. The invention of claim 1 wherein the image sensor is a charge coupled device.

9. The invention of claim 1 wherein the means for applying a smear scaling factor normalizes the gain of a pixels response to light for each and every pixel.

10. A smear correction circuit for elimination of smear error within image sensing devices (CCD) comprising:
    image receiving means for receiving CCD image data;
    means for applying a smear scaling factor for smear estimation, the smear scaling factor being determined by a ratio of smear error per given level of illumination;
    smear estimation means for applying a value of smear estimation on a per line basis;
    means for adjusting the image data corresponding to smear estimation and dark level correction; and
    means for applying the adjusted data to means for gain adjustment.

11. The invention of claim 10 wherein the smear estimation means further comprises:
    accumulation means for combining image data from successive pixels in a complete line of active pixels;
    multiplying means for applying the smear scaling factor to the accumulated pixel data for a line to determine the smear estimation; and
    storage means for temporary storage of the smear estimation to be applied to every pixel on a single line.

12. The invention of claim 10 wherein the image receiving means receives analog data.

13. The invention of claim 10 wherein the image receiving means receives digital.

14. The invention of claim 10 wherein the smear factor is determined by calibration factor application means for applying dark and gain correction data.

15. The circuit of claim 10 wherein the accumulation means for combining image data from successive pixels uses data that has been smear corrected using the smear estimate from the previous line as image data.

16. A method for eliminating smear within an image comprising the steps of:
    receiving an image in digital form;
    applying dark signal correction and gain correction data determined during a calibration cycle;
    applying a smear scaling factor for smear estimation based on dark signal and gain correction data;
    adjusting image data corresponding to the smear estimation; and
    applying the adjusted data to the image to remove smear.

17. The method of claim 16 wherein the calculating step further comprises:

accumulating image data from successive pixels in a complete line of active pixels;

multiplying the smear scaling factor to the accumulated pixel data for a line to determine the smear estimation; and storing the smear estimation to be applied to every pixel on a single line.

18. The method of claim 16 wherein the smear factor is determined by calibrating the dark and gain correction data.

19. The method of claim 17 wherein the accumulating step further comprises combining image data from successive pixels using data that has been smear corrected using the smear estimate from the previous line as image data.

\* \* \* \* \*

UNITED STATES PATENT AND TRADEMARK OFFICE
CERTIFICATE OF CORRECTION

PATENT NO. : 5,661,521
DATED : August 26, 1997
INVENTOR(S) : Lucas P. Curtis, et al It is certified that error appears in the above-identified patent and that said Letters Patent is hereby corrected as shown below:

Column 8, line 33-34     --...data to gain adjustment means.--

Signed and Sealed this

Twenty-third Day of December, 1997

Attest:

BRUCE LEHMAN

Attesting Officer

Commissioner of Patents and Trademarks